United States Patent [19]

Hopkins

[11] 4,352,609

[45] Oct. 5, 1982

[54] FACE MILLING CUTTER

[75] Inventor: David A. Hopkins, Troy, Mich.

[73] Assignee: The Valeron Corporation, Troy, Mich.

[21] Appl. No.: 182,229

[22] Filed: Aug. 28, 1980

[51] Int. Cl.³ .............................................. B26D 1/12
[52] U.S. Cl. ....................................... 407/42; 407/36
[58] Field of Search ...................... 407/42, 40, 48, 34, 407/36

[56] References Cited

U.S. PATENT DOCUMENTS

| 2,186,417 | 1/1940 | Kraus | 407/42 |
| 3,708,843 | 1/1973 | Erkfritz | 407/42 |
| 3,716,900 | 2/1973 | Erkfritz | 407/42 |
| 3,818,562 | 6/1974 | Lacey | 407/40 |

*Primary Examiner*—Leonidas Vlachos
*Attorney, Agent, or Firm*—Gordon K. Harris, Jr.; Donald A. Panek

[57] ABSTRACT

A face milling cutter is disclosed having on-edge indexable inserts located at the periphery of the cutting face of the cutter body positioned to provide principal cutting edges exhibiting relatively small true rake angle and relatively small inclination, or effective shear, angle. Each principal cutting edge is joined at its point of maximum cutting depth by a supplemental wiping edge lying substantially in the cutting plane of rotation.

9 Claims, 3 Drawing Figures

FACE MILLING CUTTER

BACKGROUND OF THE INVENTION

1. Field of the Invention

This invention relates generally to metal cutting tools and, more particularly, to face milling cutters having indexable inserts mounted thereon.

2. Description of the Prior Art

Known milling cutters used for difficult to machine materials, such as alloys of titanium, typically have employed cutting edges exhibiting high positive geometry—i.e. relatively large positive axial and radial rake angles. Such designs have shown tendencies of relatively short cutting edge life and the necessity of using large numbers of cutting inserts at relatively low feed rates for face milling operations.

One known cutter designed for taking relatively shallow cuts in materials such as titanium is described in my prior U.S. Pat. No. 4,194,860, assigned to the same assignee as the instant invention. The face mill of this prior patent, while demonstrating outstanding results in its intended application, is not capable of taking deep cuts in the range of 0.2"–0.4", due to the unique geometrical insert positioning employed.

Other milling cutters using so-called "on-edge" insert positioning are known. On-edge configurations feature mounting of a cutting insert to place a major dimension or depth of insert material behind the insert's cutting edges to better absorb cutting forces placed on the insert. With this arrangement, inserts may typically be mounted to a cutter body with relatively simple screw-down designs, avoiding the necessity for shims, wedges, or other special insert mounting and clamping hardware.

One example of a prior on-edge cutter, in addition to the cutter disclosed in my prior patent discussed above, is shown in U.S. Pat. No. 3,818,562—Lacey. However, this patent uses relatively extreme negative radial rake for the cutting edges of its disclosed cutter. Such geometry has traditionally been found deficient in cutting efficiency for applications involving difficult to machine materials such as alloys of titanium.

One prior art disclosure that superficially resembles a design capable of using the cutting edge geometry taught herein is found in U.S. Pat. No. 3,716,900—Erkfritz. However, this patent teaches cutting inserts of very complex shape with consequent high manufacturing cost. Additionally, the Erkfritz patent teaches use of relatively complex required mounting hardware.

Therefore, there is seen to be a need for a relatively simple, hence economical, face mill for taking large depths of cut in hard to machine materials such as titanium alloys.

SUMMARY OF THE INVENTION

It is an object of this invention to overcome above-described deficiencies in the prior art of milling hard to machine materials.

The invention generally comprises a face milling cutter with a plurality of circumferentially spaced on-edge indexable inserts seated in mating corner pockets formed in a cutting face of the cutter body, each insert having at least one principal cutting edge exhibiting relatively small true rake angle and relatively small inclination, or effective shear, angle, each principal cutting edge being joined at its point of maximum cutting depth with a supplemental wiping edge lying substantially in the cutting plane of rotation and terminating at the principal cutting edge in a sharp, non-radiused fashion.

It is a feature of this invention that relatively simple, inexpensive standard inserts are useable with the milling cutter disclosed herein with only minor modification.

It is a further feature of this invention that no wedges, locators, or indicating setup fixtures are required for clamping the inserts to the cutter body.

It is yet another feature of this invention that the accuracy built into a cutter body and inserts fashioned in accordance with the principles of the invention minimizes human error conventionally associated with cutter setup and runout.

DRAWING

These and other objects and features of the invention will become apparent from a reading of a detailed description of a preferred embodiment taken in conjunction with the drawing in which.

DETAILED DESCRIPTION

For the purposes of this disclosure, the conventional definitions well known to those skilled in the relevant art are used for the terms radial rake angle, axial rake angle, lead angle, inclination angle (sometimes referred to as effective cutter shear angle), and true rake angle. As is well-known in the art, "rake" is the angular relationship between a cutter face, or a tangent to that face, at a given point, and a predetermined reference plane or line.

The true rake angle can be determined by drawing an imaginary line normal to the cutting edge and intersecting the axis of the cutter body. The angle between the rake face and this imaginary line is the true rake angle.

The inclination angle can be determined by drawing an imaginary line through the center point of the cutter body and tangent to the radially outermost point of the cutting edge. The angle between this line and the cutting edge is the inclination angle.

If the plane of the rake face passes through the cutter axis, the true rake is said to be zero. If the cutting edge boundary of the rake face is ahead of the bottom boundary, the true rake is said to be positive. If the radially outermost point of the cutting edge passes through the cut first, then the inclination angle is said to be negative.

For the purposes of this disclosure, "relatively small" when used in describing cutter geometrical angles is taken to mean roughly on the order of −2 degrees to +5 degrees for the true rake angle and roughly on the order of −5 degrees to −10 degrees for the inclination angle. For these ranges, the radial and axial rake angles of the cutting edge can be calculated by those skilled in the art, as such angles are determined by the true rake and inclination angles specified above.

Figure 1:
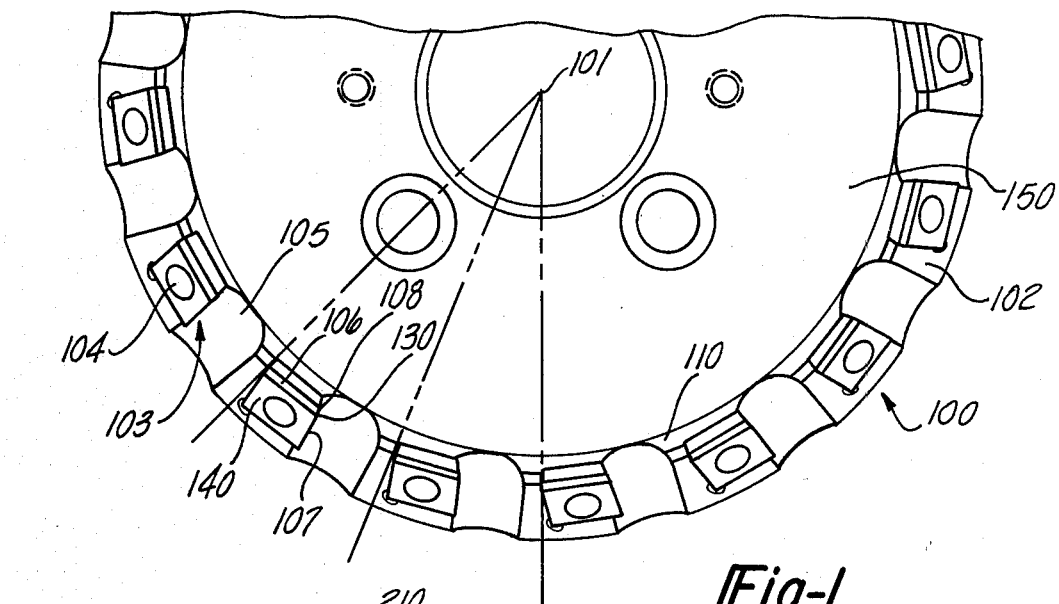
FIG. 1 is a fragmentary axial view of a milling cutter fashioned in accordance with the principles of the invention.
Figure 2:
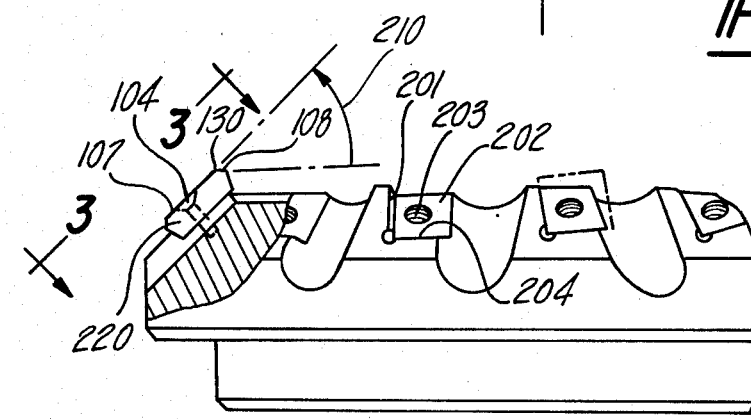
FIG. 2 is an edge-wise sectional view normal to at least one insert cutting edge of the cutter of FIG. 1.
Figure 3:
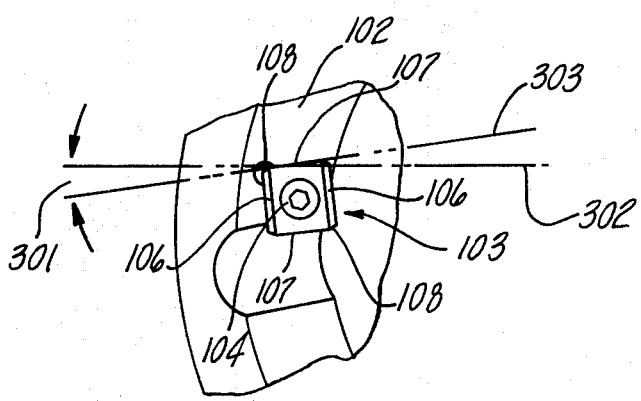
FIG. 3 is a view taken along 3—3 of FIG. 2.

With reference to FIGS. 1–3, a portion of a face milling cutter includes generally circular cutter body 100 having generally frusto-conical cutting face 102 with a plurality of insert locating corner pockets therein, each pocket defined by a bottom insert seating surface 202, and two substantially perpendicular side insert locating surfaces 201 and 204. Cutter 100 rotates about a central axis 101. A tapped hole 203 in the cutting face is located in bottom surface 202 of each pocket. Conical bevel 110 smoothly joins cutting face 102 with the end surface 150 of cutter 100.

Placed in substantially mating engagement in each pocket in on-edge fashion is a cutting insert 103 held in place by a suitable clamping screw 104 threadingly engaged in mating tapped hole 203. Each insert 103 includes a pair of principal cutting edges 107, one of which is placed in an operative cutting position above a chip gullet 105 formed in the cutter body ahead of each insert locating corner pocket. Additionally, each insert principal cutting edge 107 intersects at a point 130 of maximum cutting depth with a supplemental wiping cutting edge 108 lying substantially within the cutting plane of rotation. This intersection forms a sharp corner with substantially no radius of curvature, an important characteristic for facilitating face milling of difficult to machine materials, such as alloys of titanium. A substantially sharp juncture between principal and supplemental edges tends to disrupt any overlap of cutting action or continuation of consequently formed chips from the respective edges, thereby avoiding insert corner damage at the point 130 of maximum depth of cut which is often found with inserts having conventionally radiused corners.

Each supplemental wiping edge is formed by modifying a standard positive clearance angle insert by machining two flats 106 along the two insert top edges normal to the principal cutting edges 107. In a preferred embodiment flats 106 form an angle of approximately 135 degrees with the top or clearance face 140 of each insert 103. The principal and supplemental edges share a common rake face 220. Each flat 106 has a width capable of overlapping the advance per revolution of its associated principal cutting edge, thereby providing effective wiping action over the entire milled surface.

In a preferred embodiment, 11 degree clearance angle inserts modified with the above-described flats are mounted such that a 45 degree lead angle 210 is provided. The preferred inclination angle is on the order of 5 degrees negative, and is shown greatly exaggerated as angle 301 of FIG. 3, where line 302 passes through the center point of the cutter body and through the radially outermost point of a cutting edge 107, and where line 303 is on extension of edge 107 itself. The preferred true rake angle lies in the range of about 0 degrees to 3 degrees positive. With inclination and true rake angles in these preferred ranges, the cutting edge will consequently exhibit radial rake on the order of 0 degrees to 2 degrees positive, while the axial rake will be on the order of 4 degrees to 6 degrees negative.

One specific embodiment using the above-described cutter geometry has produced outstanding results in terms of metal removal per unit of time. This cutter utilized 14 inserts, each ¾" square and 3/16" thick, modified with two 135 degree lands to form two supplemental and two principal cutting edges per indexable 11 degree clearance angle insert. The tool life per principal cutting edge, based on total stock removal, was almost three times greater than that achieved with a prior art cutter having 44 inserts. Five inches per minute feed at a maximum cutting depth of 0.4" in titanium forgings was achieved.

The relatively simple nature of the substantially rectangular locating pockets for on-edge inserts, combined with the use of standard positive inserts easily modified to provide the wiping edges, makes cutters fashioned in accordance with the geometries taught herein economically attractive approaches to face milling of hard to machine materials.

What I claim is:

1. A face milling cutter comprising an annular body rotatable about an axis thereof and including means for mounting and positioning in on-edge fashion a plurality of circumferentially spaced cutting inserts, such that each insert presents a principal cutting edge joined at its maximum cutting depth by a supplemental wiping edge lying substantially in the cutting plane of rotation, the intersection of the principal and supplemental edges forming a sharp corner with substantially no radius of curvature, each principal cutting edge positioned to exhibit relatively small negative inclination and positive true rake angles.

2. The cutter of claim 1 wherein each of the inserts is of generally rectangular shape.

3. The cutter of claim 2 wherein each insert is provided with a positive clearance angle between a relatively large insert clearance face and a relatively narrow insert rake face, the principal cutting edge being defined by the intersection of the clearance and rake faces.

4. The cutter of claim 1 wherein each principal cutting edge is positioned to exhibit a true positive rake angle in the range of approximately 0 to 3 degrees and a negative inclination angle on the order of about 5 degrees.

5. The cutter of claim 3 wherein each principal cutting edge is positioned to exhibit a true positive rake angle in the range of approximately 0 to 3 degrees and a negative inclination angle on the order of about 5 degrees.

6. The cutter of claim 5 wherein the inserts are mounted to provide approximately 45 degree lead angle.

7. The cutter of claim 6 wherein each insert includes at least one substantially planar land running from the insert rake face rearwardly along a radially inner-most insert edge, the supplemental edge being defined by the intersection of the land with the insert rake face.

8. The cutter of claim 7 wherein the land forms an angle of approximately 135 degrees with the insert clearance face.

9. The cutter of claim 2 wherein the means for mounting and positioning includes a plurality of circumferentially spaced corner pockets formed in the annular body, each pocket defined by a bottom insert seating surface substantially perpendicular to and intersecting two substantially mutually perpendicular side insert locating surfaces.

* * * * *